United States Patent [19]

Harvey

[11] Patent Number: 5,059,993
[45] Date of Patent: Oct. 22, 1991

[54] VIEW FINDER MODE SELECTOR AND SHUTTER RELEASE MEANS

[75] Inventor: Donald M. Harvey, Webster, N.Y.

[73] Assignee: Eastman Kodak Company, Rochester, N.Y.

[21] Appl. No.: 601,549

[22] Filed: Oct. 23, 1990

[51] Int. Cl.$^5$ ............................................. G03B 13/12
[52] U.S. Cl. ..................................... 354/222; 354/266
[58] Field of Search ................... 354/195.12, 221, 222, 354/266, 267.1, 268, 269

[56] References Cited

U.S. PATENT DOCUMENTS

| | | | |
|---|---|---|---|
| 3,034,411 | 5/1962 | Sauer | 354/469 |
| 3,094,051 | 6/1963 | Hutchison et al. | 354/447 |
| 3,186,319 | 6/1965 | Hochstein | 354/266 |
| 3,315,579 | 4/1967 | Land | 354/411 |
| 4,166,686 | 9/1979 | Schrader | 354/266 |
| 4,716,427 | 12/1987 | Shyu | 354/222 X |
| 4,931,818 | 6/1990 | Gates | 354/222 |
| 4,933,694 | 6/1990 | Gates et al. | 354/222 |
| 4,961,084 | 10/1990 | Komatsuzaki et al. | 354/268 |
| 4,973,997 | 11/1990 | Harvey | 354/222 X |

*Primary Examiner*—A. A. Mathews
*Attorney, Agent, or Firm*—Roger A. Fields

[57] ABSTRACT

A photographic camera includes a viewfinder having a plurality of settable viewing modes and a shutter release means. A single actuating member is movable in a plane between a plurality of mode setting positions for setting the viewing mode of the viewfinder. The actuating member is movable perpendicular to the plane to actuate the shutter release means.

13 Claims, 3 Drawing Sheets

5,059,993

VIEW FINDER MODE SELECTOR AND SHUTTER RELEASE MEANS

CROSS-REFERENCE TO RELATED APPLICATIONS

Reference is made to commonly assigned copending U.S. application Ser. No. 601163 entitled "Two Magnification Three Mask Viewfinder" and filed concurrently herewith in the name of Donald M. Harvey.

TECHNICAL FIELD

This invention relates to viewfinders for photographic cameras and, more particularly, to apparatus for selecting the viewing mode of a viewfinder having a plurality of viewing modes.

BACKGROUND ART

In U.S. Pat. No. 4,652,104 entitled "Pseudo Format Camera With Zoom Finder," there is disclosed a basic pseudo pan/pseudo tele camera. In such a camera it is desirable for the user to see in the viewfinder the scene which will ultimately appear in the print as a result of magnification and/or masking of the negative during the printing process. With a tele/pan camera the tele and pan negative to print magnifications are equal but are substantially different from that of a normal photograph. Accordingly it is desirable for the viewfinder to employ one optical system for normal photography and a second optical system for tele and pan viewing.

While the same optical system can be used for both pan and tele viewing, it is desirable to have the field of view adjusted so that the user sees that portion of the scene to be printed in each mode. Accordingly, it is desirable for the finder to have two optical magnifications (one for normal viewing and one for pseudo pan/tele viewing) and three field defining masks (one for normal viewing, one for tele viewing and one for pan viewing).

In copending application Ser. No. 601,163, cross-referenced above, there is disclosed a viewfinder system having a first manually movable member for selectively positioning optical assemblies and masks to produce normal, pan and tele modes of viewing. The positioning member has three discrete positions corresponding to the three viewing modes. A second manually operated member is provided for controlling shutter release. To photograph a scene, the user must first set the mode with the mode selector and then activate the shutter release.

DISCLOSURE OF THE INVENTION

It is an object of the present invention to provide a single control member which controls shutter release and viewfinder mode selection.

In accordance with the invention, a single actuating member is movable between a plurality of mode selecting positions for setting the viewing mode of a viewfinder and to a shutter release position to actuate a shutter release means.

BRIEF DESCRIPTION OF THE DRAWINGS

Other objects and advantages will become apparent from the following description taken in connection with the accompanying drawings wherein.

MODE OF CARRYING OUT THE INVENTION

Figure 1:
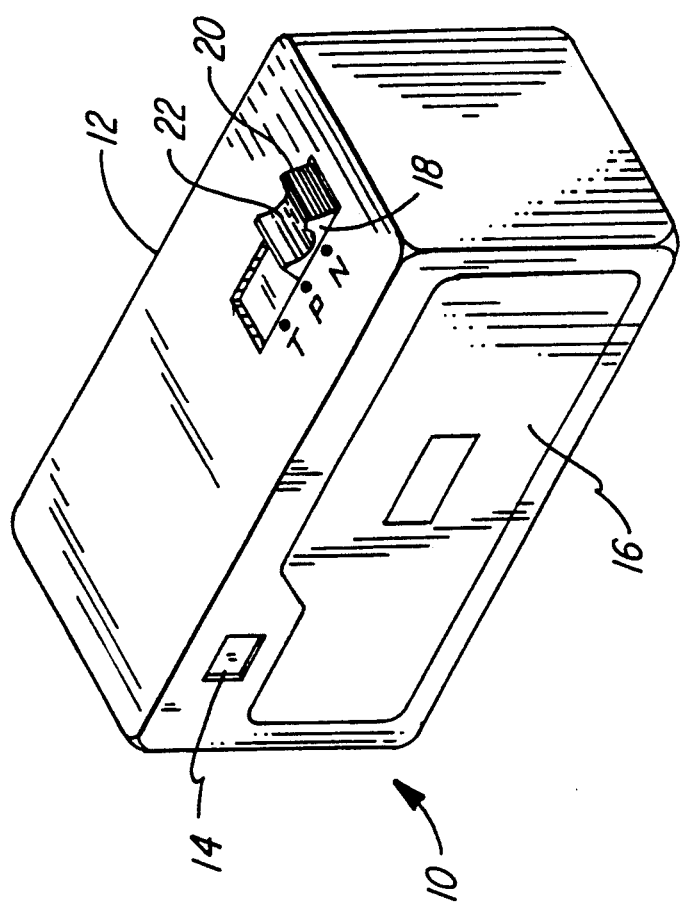
FIG. 1 is a perspective view of a photographic camera.

Referring to FIG. 1, there is shown a pseudo pan, pseudo tele photographic still camera 10 having a camera body 12, a viewfinder window 14, and a rear door 16.

The camera 10 incorporates a three mode viewfinder for permitting the user to view the scene which will be subsequently printed during photofinishing. As indicated schematically in FIG. 2, the viewfinder system includes an optical system 16 having tele, pan and normal positions and a movable positioning bar 17 for positioning the optical system 16 and associated masks (not shown). The optical system 16 and bar 17 may take the form of that disclosed in my commonly assigned copending application Ser. No. 601163 cross-referenced above and filed concurrently herewith, the disclosure of which is hereby incorporated by reference.

In accordance with the invention, the camera 10 includes a mode selector and shutter release means comprising an elongated member 18 which has an upper portion 20 provided with a concave surface 22 shaped to permit manipulation of the member 18 by the user and serrated surfaces to facilitate such manipulation. The portion 20 extends through an opening 24 in the camera body, the opening having sufficient length to permit movement of the member 18 through a predetermined range.

Figure 3:
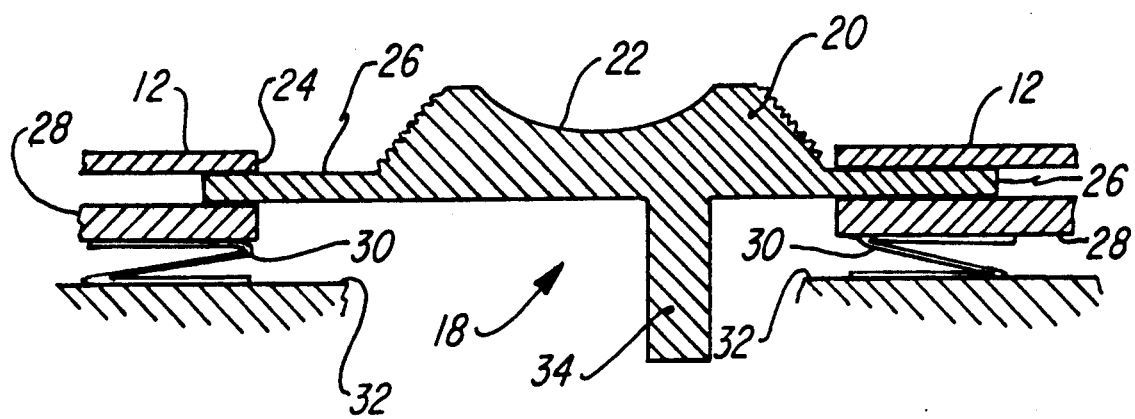
FIG 3 is a side view illustrating the mounting of the mode selector and shutter release member.

The member 18 further includes a pair of flanges 26 at its opposite ends, respectively, which slidably engage surfaces of the camera body 12. The member 18 is supported in the camera body by a pair of movable supporting flanges 28 which are biased upward as viewed in FIG. 3 by leaf springs 30 mounted between their respective flanges and surfaces 32 of the camera body. The flanges 28 and springs 30 serve to urge the member 18 upward into engagement with the camera body to permit rectilinear movement of the member 18 between three mode positions: tele; pan; and normal, as indicated in FIG. 1. However, as described below, the resilient support of member 18 by flanges 28 and springs 30 permit the member 18 to be depressed by the user against the bias of springs 30 to effect shutter release.

Figure 2:
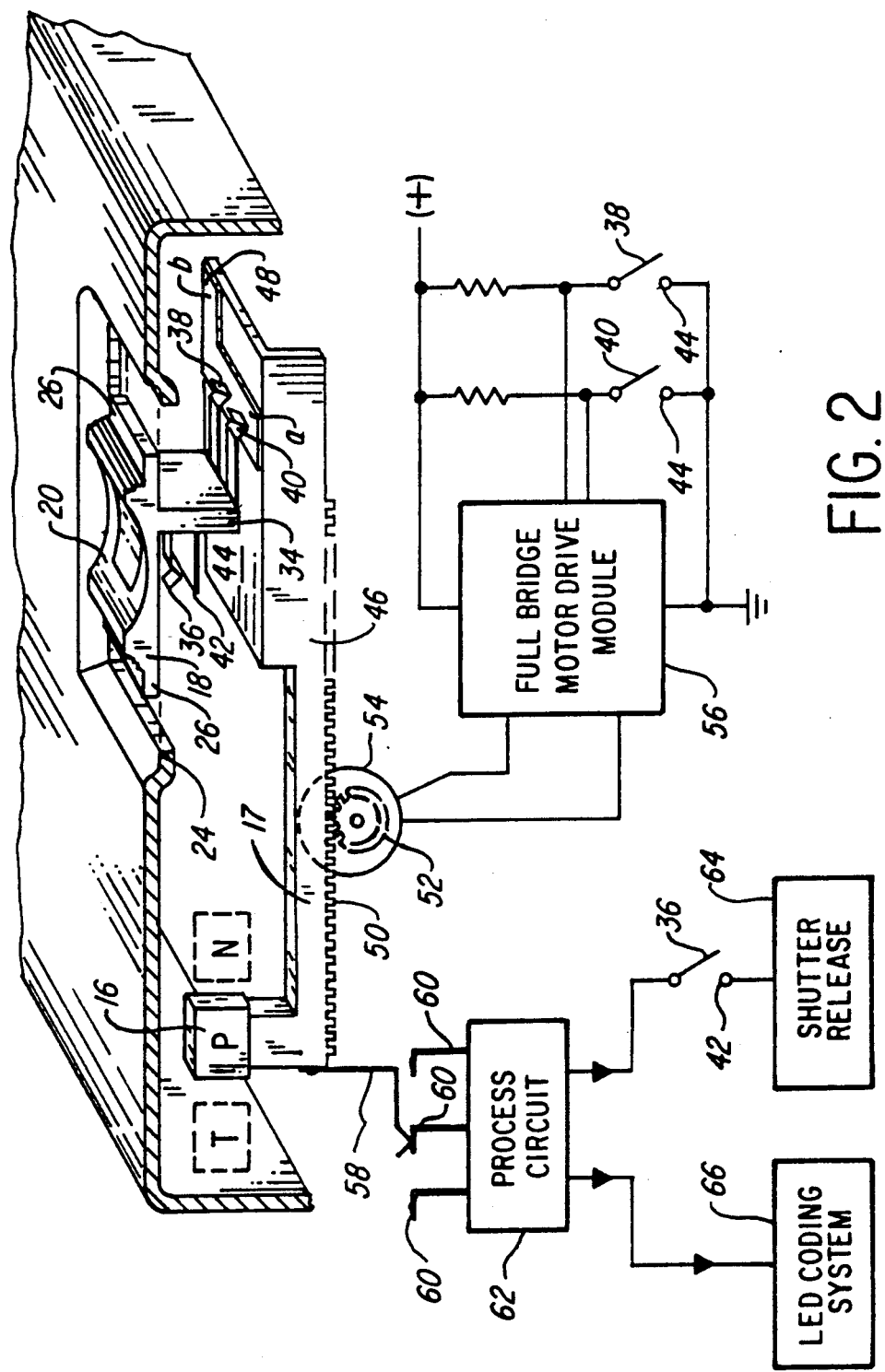
FIG. 2 is a schematic perspective view illustrating the mode selector and shutter release member in accordance with the present invention.

Referring to FIG. 2, the member 18 further includes a depending flange 34 which has a plurality of flexible switch contact arms 36, 38 and 40 fixed to it. One arm 36 is adapted to contact a fixed elongated contact strip 42 upon depression of the member 18 in any of its three positions to effect shutter release. The contacts 38 and 40 are adapted to contact a grounded conductive surface 44 coated on an elongated extension 46 of the bar 17 during rectilinear movement of the member 18. An L-shaped insulator patch 48 has a segment (a) extending transversely of the extension 46 and a segment (b) extending longitudinally of the extension 46 along one edge thereof.

In the center or pan position of member 18, both contact arms 38 and 40 contact the transverse insulating segment (a) of patch 48. If member 18 is moved to the right to its normal viewing position, contact 38 will ride on segment (b) of patch 48 and contact 40 will engage and make electrical contact with the surface of conductive coating 44. If the member 18 is moved to the left from the center position shown in FIG. 2, both contact arms 38 and 40 will engage and make electrical contact with the conductive coating 44.

Referring now to the control functions of contact arms 38 and 40, the bar 17 is movable between its three mode positions by a gear means comprising a gear rack 50 on the bar 17 and a pinion gear 52 driven by an electrical motor 54. The motor 54 is coupled to the output of a full bridge motor drive module 56. The switch means defined by contact arm 40 and conductive coating 44 comprises an enabling switch which, when closed by movement of member 18 to the right, activates the motor drive 56 and effects rotation of motor 54 to drive bar 17 to the right, as viewed in FIG. 2, to position the optical assembly in its normal viewing position. The switch means defined by contact arm 38 and conductive coating 44 comprises a motor reversing switch which, when closed by movement of member 18 to the left from the position shown in FIG. 2, will cause motor drive 56 to rotate motor 54 in the opposite direction to position the optical assembly in its left or tele position. In this case, enabling switch means 40 and 44 will also be closed to activate the motor drive 56. The center or pan position of member 18 is also a null position. Movement of member 18 to the center position from either its right or left position will cause the motor drive module to activate motor 54 to also return the optical assembly to its center position. Since full bridge motor drive modules capable of responding to enabling and reversing switch means are commercially available and well known in the art, further disclosure is deemed unnecessary.

The system depicted in FIG. 2 may also be provided with an enabling switch means for the shutter release means. As indicated schematically, a switch contact 58 carried by the bar 17 may be arranged to contact one of three fixed contacts 60 in each of the three positions of the slide release member 18 to couple a power source to a process controller 62 adapted to activate a shutter release 64. The controller 62 can also be arranged to activate an LED coding system 66 for coding the film (not shown), to indicate the format in which individual frames are to be printed.

Figure 4:
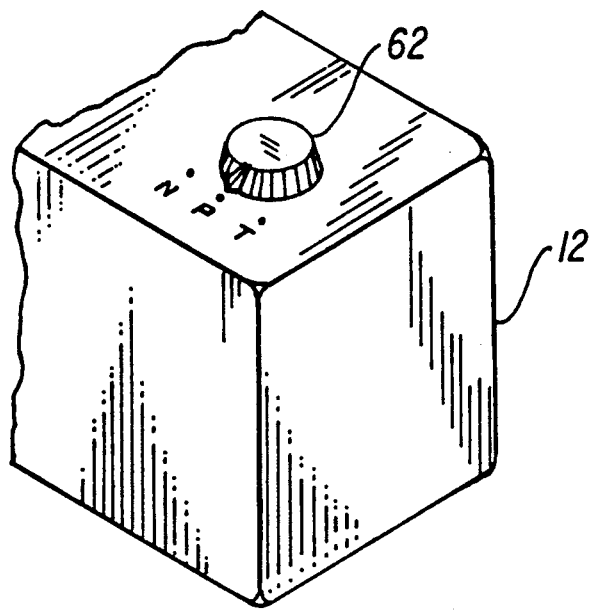
FIG. 4 is a perspective view illustrating a portion of an alternative embodiment of the invention.

It will be apparent to those skilled in the art that the shutter release/mode switch disclosed can be embodied in a rotary form instead of the rectilinear form disclosed. A portion of such an embodiment is shown in FIG. 4 as comprising a rotary knob 62 having three angular mode positions. In this case, the conductive coating and insulator patch would comprise arcuate segments of a circular disc. As in the case of the FIG. 1-4 embodiment, the knob 62 may be depressed to effect shutter release in any of the three modes. This embodiment would be used in combination with, the FIG. 4 embodiment of application Ser. No. 601163 cross-referenced above.

Those skilled in the art to which the invention relates will appreciate that various substitutions and modifications can be made to the described embodiment without departing from the spirit and scope of the invention as described by the claims below.

I claim:

1. In a photographic camera including a viewfinder having a plurality of settable viewing modes and actuatable shutter release means, the improvement comprising:

a single actuating member movable between a plurality of mode selecting positions for setting the viewing mode of the viewfinder and to a shutter release position for actuating said shutter release means.

2. In a photographic camera as claimed in claim 1 wherein said actuating member is movable in a first direction between said mode selecting positions and a second direction to said shutter release position.

3. In a photographic camera as claimed in claim 2 wherein said improvement further comprises:

an elongated opening in the camera, said actuating member extending into said opening and movable in the plane of said opening between said mode setting positions, said member being movable perpendicular to the window to said shutter release position.

4. In a photographic camera including a camera body, a viewfinder optical system having a plurality of operative viewing modes, movable means having a plurality of positions for selectively setting said optical system in said modes, and actuatable shutter release means, the improvement comprising:

a single actuating member movable between a plurality of mode setting positions and to a shutter release position;

means responsive to movement of said actuating member to said mode setting positions to effect movement of said movable means to set said optical system in a corresponding viewing mode; and means responsive to movement of said actuating member to said shutter release position for actuating said shutter release means.

5. In a photographic camera as claimed in claim 4 wherein the improvement further comprises:

means for movably supporting said member on the camera body for movement in one direction in a predetermined plane between said mode setting positions and in a second direction to said shutter release position.

6. In a photographic camera as claimed in claim 5 wherein the improvement further comprises:

means for biasing said member away from said shutter release position, said member being movable against said bias to said shutter release position.

7. In a photographic camera as claimed in claim 6 wherein the improvement further comprises:

an elongated opening in the camera body, said actuating member having a portion extending into said opening.

8. In a photographic camera as claimed in claim 7 wherein said means for movably supporting said actuating member supports said member for movement between said mode setting positions in the plane of said opening and for movement substantially perpendicular to said plane to said shutter release position.

9. In a photographic camera as claimed in claim 8 wherein said actuating member has a portion extending through said opening to the exterior of the camera, said actuating member being movable to said shutter release position by application of pressure to said portion.

10. In a photographic camera as claimed in claim 9 wherein said means for movably supporting said actuating member comprises:

at least one pair of guide flanges on the camera body; and at least one surface on said actuating member positioned between said guide flanges, said biasing means urging one of said guide flanges into engagement with said surface, said one flange being movable against the bias of said biasing means upon movement of said actuating member to said shutter release position.

11. In a photographic camera as claimed in claim 9 wherein said actuating member comprises an elongated member having flanges at opposite ends thereof respectively; said means for movably supporting said actuating member comprising guide means on the camera body engaging said flanges, said biasing means urging said guide means into engagement with said flanges.

12. In a photographic camera as claimed in claim 6 wherein said means responsive to movement of said actuating member to said shutter release position comprises switch means actuatable to a closed state in response to movement of said member against said bias to said shutter release position.

13. In a photographic camera as claimed in claim 12 wherein said means responsive to movement of said actuating member to effect movement of said movable means comprises a reversible electric motor for positioning said movable means; means for controlling said motor; and switch means responsive to movement of said actuating member for activating said motor controlling means.

* * * * *